US010742809B1

(12) United States Patent
Schuler et al.

(10) Patent No.: US 10,742,809 B1
(45) Date of Patent: Aug. 11, 2020

(54) DEVICE, SYSTEM AND METHOD FOR DUPLICATE CALL HANDLING AT A PUBLIC-SAFETY ANSWERING POINT DEVICE

(71) Applicant: MOTOROLA SOLUTIONS, INC., Chicago, IL (US)

(72) Inventors: Francesca Schuler, Palatine, IL (US); James C. Duran, Palatine, IL (US); Allen F. Bonney, Evanston, IL (US); Christopher E. Blackshear, Hoffman Estates, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/697,887

(22) Filed: Nov. 27, 2019

(51) Int. Cl.
*H04M 3/51* (2006.01)
*G06F 40/30* (2020.01)
*G10L 15/18* (2013.01)
*G10L 15/22* (2006.01)

(52) U.S. Cl.
CPC .......... *H04M 3/5116* (2013.01); *G06F 40/30* (2020.01); *H04M 3/5183* (2013.01); *G10L 15/1815* (2013.01); *G10L 15/22* (2013.01)

(58) Field of Classification Search
USPC ......................................... 379/33; 455/404.1
See application file for complete search history.

(56) References Cited

U.S. PATENT DOCUMENTS

| 9,390,422 | B2 | 7/2016 | Toomey | |
|---|---|---|---|---|
| 10,212,281 | B2* | 2/2019 | Czachor, Jr. | ......... H04M 3/5116 |
| 10,306,059 | B1 | 5/2019 | Bondareva et al. | |
| 2008/0101553 | A1* | 5/2008 | Goldman | ............ H04M 3/2218 379/45 |
| 2011/0060378 | A1* | 3/2011 | Tuysserkani | ............. A61N 1/39 607/5 |
| 2011/0281546 | A1* | 11/2011 | Libkind | .............. H04L 12/1895 455/404.1 |
| 2014/0192964 | A1* | 7/2014 | Bhogal | ................ H04M 3/5116 379/45 |
| 2019/0174289 | A1* | 6/2019 | Martin | .................... H04L 67/02 |
| 2019/0380020 | A1* | 12/2019 | Pellegrini | .............. G08B 25/00 |

* cited by examiner

*Primary Examiner* — Maria El-Zoobi
(74) *Attorney, Agent, or Firm* — Perry + Currier, Inc.

(57) ABSTRACT

A device, system and method for duplicate call handling at a public-safety answering point (PSAP) device is provided. The PSAP device: routes a call from a caller to a call-taker, the call associated with an incident; receives, via an input device of the call-taker, information related to the incident to populate a record associated with the call; prior to the record being complete, receives, via the input device, input to handover the call to an information collection application, the input indicative of the call being a duplicate call; determines, via the information collection application, remaining information to be collected based on one or more of: a duplicate call policy and the information already received; receives, via the information collection application to verbally communicating with the caller on the call, at least a portion of the remaining information to continue to populate the record; and ends the call.

20 Claims, 5 Drawing Sheets

DEVICE, SYSTEM AND METHOD FOR DUPLICATE CALL HANDLING AT A PUBLIC-SAFETY ANSWERING POINT DEVICE

BACKGROUND OF THE INVENTION

When a caller uses a device, such as a mobile phone, and the like, to call a public-safety answering point (PSAP, for example a 911 call center), to report an incident, it may be important to efficiently collect information from the caller.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

When a caller uses a device, such as a mobile phone, and the like, to call a public-safety answering point (PSAP, for example a 911 call center), to report an incident, it may be important to efficiently collect information from the caller. In particular, a call-taker at the PSAP may be handling tens to hundreds of calls (e.g., represented by "cards" rendered at a display device). Some of the calls may be duplicates; for example, a first caller reporting a public-safety incident may provide critical information, while a second caller reporting the same public-safety incident may not report any critical information and/or any further critical information. Hence, such duplicate calls may waste the time and resources of the call-taker, which may reduce efficiency of data collection at the PSAP.

An aspect of the present specification provides a method comprising: routing, via a public-safety answering point (PSAP) device, a call to a communication device of a call-taker, the call associated with an incident, the call being from a caller; receiving, via an input device associated with the call-taker, information related to the incident to populate a record associated with the call; prior to the record being complete, receiving, via the input device, input to handover the call to an information collection application implemented by the PSAP device, the input indicative of the call being a duplicate call; determining, via the PSAP device implementing the information collection application, remaining information to be collected based on one or more of: a duplicate call policy and the information already received; receiving, via the PSAP device implementing the information collection application to verbally communicate with the caller on the call, at least a portion of the remaining information to continue to populate the record; and ending, via the PSAP device, the call.

Another aspect of the present specification provides a computing device comprising: a communication unit; and a controller configured to: route, via the communication unit, a call to a communication device of a call-taker, the call associated with an incident, the call being from a caller; receive, via an input device associated with the call-taker, information related to the incident to populate a record associated with the call; prior to the record being complete, receive, via the input device, input to handover the call to an information collection application, the input indicative of the call being a duplicate call; determine, via the information collection application, remaining information to be collected based on one or more of: a duplicate call policy and the information already received; receive, via the information collection application verbally communicating with the caller on the call, at least a portion of the remaining information to continue to populate the record; and end the call.

Figure 1:
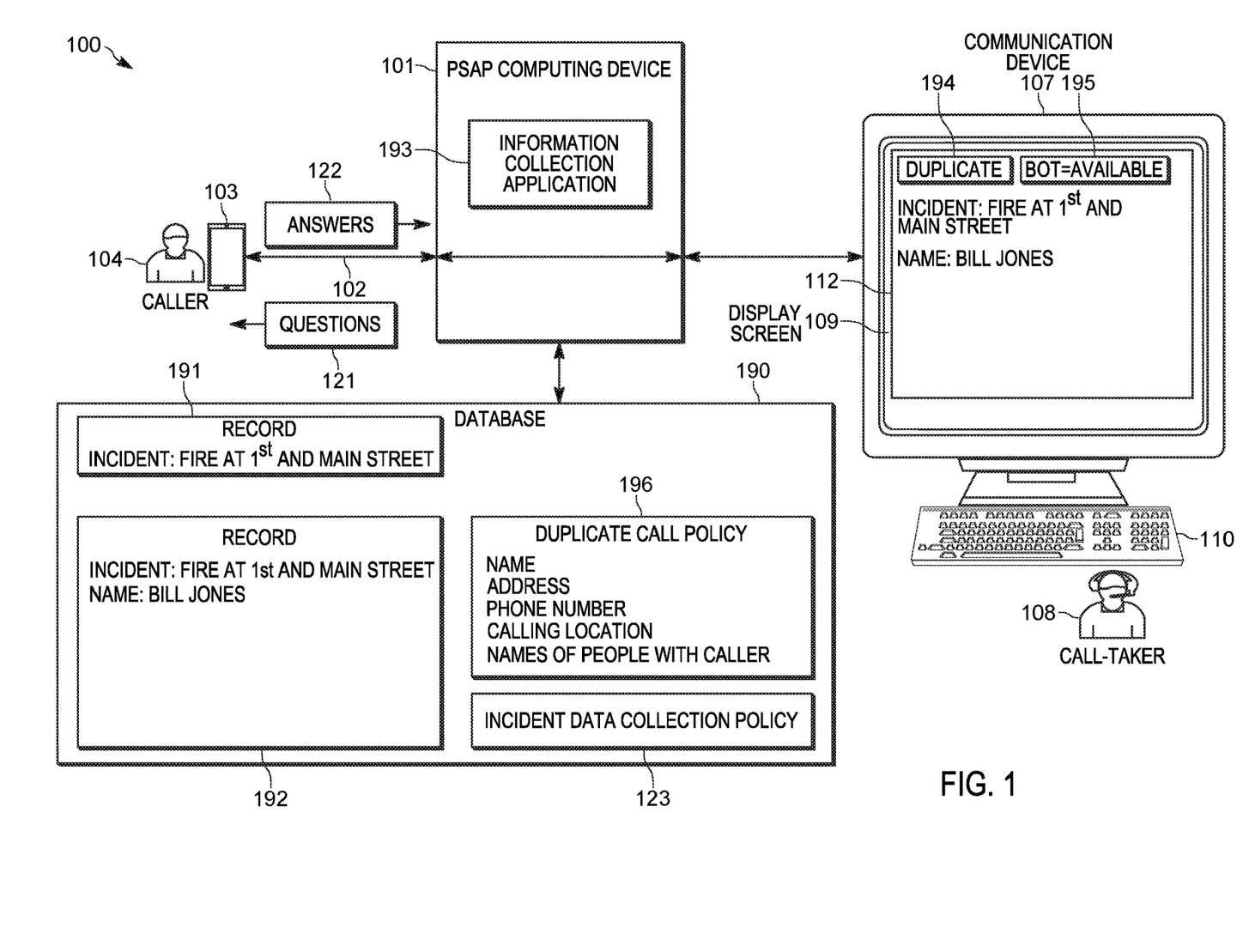
FIG. 1 is a system for duplicate call handling at a public-safety answering point device, in accordance with some examples.

Attention is directed to FIG. 1, which depicts an example system 100 for duplicate call handling at a public-safety answering point device. The system 100 comprises a computing device 101, which may comprise (e.g. as depicted) a public-safety answering point (PSAP) device and/or computing device. The computing device 101, interchangeably referred to hereafter as the PSAP device and/or the device 101, is generally configured to receive calls; for example, as depicted, a call 102 from a calling device 103 operated by a caller 104 is received at the device 101. In particular, the caller 104 is understood to be reporting a public-safety incident; furthermore, it is understood that the caller 104 is not the first caller to report the public safety incident, and hence the call 102 may be determined to be a duplicate call, as described in more detail below. In particular, it is understood that a duplicate call as described herein is at least a second call in which a given public safety incident is being reported. Hereafter, the terms "incident" and "public-safety incident" are used interchangeably.

As depicted, the system 100 further comprises a communication device 107 in communication with the device 101 via a communication link. As depicted, the communication device 107 may comprise a dispatch terminal to which the device 101 may forward the call 102. The communication device 107 is generally operated by a human user, for example, as depicted, a call-taker 108, such as a 911 call center operator, a dispatcher, and the like. The communication device 107 generally includes a display screen 109. As depicted, the communication device 107 may further comprise an input device 110, which may include, but is not limited to, a keyboard (e.g. as depicted), a pointing device, a microphone, and the like, and/or any other suitable input device configured to receive input, for example by the call-taker 108 operating the input device 110 and/or interacting with the input device 110.

As depicted, the calling device 103 comprises a mobile device, but the calling device 103 may comprise any suitable communication device for making a call to the device 101 including, but not limited to, the depicted mobile device, public switched telephone network (PSTN) telephones, laptops, personal computers, and the like. Furthermore, the call 102 may occur via any suitable wireless or wired network and may include, but are not limited to, mobile phone calls, PSTN calls, Internet Protocol (IP) calls, calls made using applications, and the like.

While one calling device 103 is depicted in FIG. 1, the system 100 may comprise any suitable number of calling devices 103 and associated callers 104; similarly, while one communication device 107 is depicted in FIG. 1, the system 100 may comprise any suitable number of communication devices 107 (e.g. dispatch terminals) and associated call-takers 108 and/or human users. Indeed, it is understood in FIG. 1 that the caller 104 is at least a second caller reporting a given public-safety incident (e.g. using another calling device) such that the call 102 may be determined to be a second call.

The device 101 may be configured to receive the call 102, from the calling device 103 and the like, in association with a PSAP, a 911 call center, and the like. For example, a communication device 107 may comprise a terminal of the PSAP, and a human user of a communication device 107 may comprise a call-taker 108 of the PSAP.

However, while present examples will be described with respect to a PSAP, the device 101 may be configured to receive calls 102 for any suitable type of call center, dispatch center, and the like.

As depicted, for example, the caller 104 has operated the calling device 103 to initiate the call 102 using a number (e.g. "911") for the PSAP, for example to report an incident. The device 101 automatically receives and/or answers the call 102 thereby causing a communication link between the device 101 and the calling device 103 to be generated using any suitable combination of wired and/or wireless networks. Communication links between components of the system 100 are depicted in FIG. 1, and throughout the present specification, as double-ended arrows between respective components; the communication links may include any suitable combination of wireless and/or wired links and/or wireless and/or wired communication networks. Hence, for example, communication links between the device 101 and the communication device 107 are generally established and the device 101 may forward and/or transfer the call 102 from the calling device 103 to the communication device 107 over such communication links.

Indeed, as depicted, the device 101 has routed the call 102 to the communication device 107; while the routing is depicted as being via the device 101, the routing may be via any suitable routing devices.

As depicted, the call-taker 108 has answered the call at the communication device 107 and a card 112 has been generated and rendered at the display screen 109. the card 112 comprises a graphic user interface (GUI) which represents the call 102. The call-taker 108 may then speak with the caller 104 on the call 102 and enter information about the incident into the card 112, by way of operating the input device 110. For example, as depicted, the call-taker 108 is asking questions 121 of the caller 104 on the call 102 (e.g. as audio conveyed over the call 102), and the caller 104 is providing answers 122 to the questions 121 (e.g. also as audio being conveyed over the call 102). For example, the call-taker 108 may be following a script and/or an incident data collection policy 123 (described in more detail below) to determine information about the incident that the caller 104 is reporting, and/or which questions 121 to ask. In some examples the incident data collection policy 123 may be retrieved and identifiers of information to be collected, as defined by the incident data collection policy 123 may be provided at the display screen 109.

As depicted, for example, the caller 104 is reporting an incident, and the call-taker 108 is speaking to the call 102 to ask the questions 121 for information about the incident, for example as defined by incident data collection policy 123. As depicted, the call-taker 108 has entered an incident identifier (e.g. "Fire at $1^{st}$ and Main Street") at the card 112 (e.g. in a field for an incident type and address thereof, though such fields may have any suitable format; for example separate fields may be used for an incident type and an address of an incident). As depicted, the call-taker 108 has also entered a name of the caller (e.g. "Bill Jones"), at a corresponding field of the card 112, which may have been provided in the answers 122 and/or in any audio provided by the caller 104.

For example, as depicted, the system 100 further comprises at least one database 190 in communication with the device 101. The database 190 may comprise any suitable database and/or memory, and the like.

As depicted, the database 190 stores the incident data collection policy 123 that defines information to be collected for an incident; while not depicted, the incident data collection policy 123 may include a type of an incident, a location and/or address of the incident, critical information about the incident (e.g. a size of the fire, any injured victims, and the like), dispatch information (e.g. identifiers of first responders and/or associated first responder vehicles dispatched to the incident), a name, address, telephone number, calling location, and the like, of a caller that reported the incident. The information defined by the incident data collection policy 123 may comprise any suitable information and may vary by jurisdiction; for example, the incident data collection policy 123 may comprise minimum information to be collected on calls to the device 101, as defined by a jurisdiction operating the device 101 (e.g. a first county of a state may require given information be collected on a 911 call, while a second county of the state may require different given information be collected on a 911 call).

As depicted, the database 190 stores a first record 191 of the incident being reported by the caller 104 (e.g. a "Fire at $1^{st}$ and Main Street") which was previously generated when a previous caller reported the same incident that the caller 104 is reporting. For example, it is understood that the previous caller called the device 101 to report the incident and spoke with a call-taker, and information about the incident received from the previous caller was stored at the record 191. Indeed, while the record 191 is depicted only with an incident identifier of the incident (e.g. "Fire at $1^{st}$ and Main Street") it is understood that the record 191 comprises the information defined by the incident data collection policy 123 (though the record 191 may contain less than all of the information defined by the incident data collection policy 123, for example when the previous caller was injured and/or hung up before all the information could be collected). It is further understood that the record 191 may correspond to a previous card that was rendered at the display screen 109, and/or another display screen of another communication device and/or dispatch terminal (e.g. with which the device 101 is in communication), and the like, when the previous caller reported the incident.

Indeed, in the system 100, an associated record may be generated (e.g. by the device 101) and stored at the database 190 for a call received at the device 101, and/or an associated record may be generated (e.g. by the device 101) and stored at the database 190 for each card rendered at the display screen 109 (or other display screens of other communication devices and/or dispatch terminals with which the device 101 is in communication). For example, as depicted, the database 190 stores a second record 192 that was generated and stored when the call 102 was received and/or the card 112 was generated. As information at the card 112 is entered, the information is also stored at the corresponding record 192 by the device 101. For example, as depicted, the record 192 stores the incident type and address received at the card 112 (e.g. "Fire at $1^{st}$ and Main Street"), as well as the name of the caller 104 (e.g. "Bill Jones").

As depicted, the device 101 is implementing an information collection application 193. The information collection application 193 may comprise an automated information collection application configured to cause the device 101 to verbally communicate with the caller 104 to collect information from the caller 104, as described herein.

The information collection application 193 may further be configured to cause the device 101 to handle calls to the device 101, for example to determine when to handover a call with which the information collection application 193 is communicating to the communication device 107, as described herein. The information collection application 193 may hence provide any suitable functionality to the device 101 for verbally communicating with callers and/or handling calls. Examples of some specific functionality enabled by the information collection application 193 are described in further detail below.

Furthermore, the information collection application 193 may include and/or have access to, a text-to-speech module to cause the device 101 to ask questions (e.g. such as the questions 121) to the caller 104, and cause the device 101 to transcribe audio of the caller 104 (e.g. such as the answers 122) to text using a speech-to-text module (e.g. also described below). Furthermore, the information collection application 193 may include and/or have access to a natural language processing (NLP) module (described below) which may be used to cause the device 101 to determine whether audio from the caller 104 includes critical information. Using the text transcribed from audio of the, and/or the NLP module, the device 101 implementing the information collection application 193 may determine that the call 102 is a duplicate call (e.g. based on the records 191, 192 being associated with a same given incident).

For example, as depicted, the device 101 has determined that the call 102 is a duplicate call (e.g. based on the records 191, 192 being associated with a same given incident), and has controlled the display screen 109 to render and/or provide an indication 194 of the call 102 being a duplicate call, for example at the card 112. As depicted, the indication 194 comprises text "Duplicate", though the indication 194 may comprise any suitable text and/or graphical indicator of the call 102 being a duplicate call.

As depicted, the device 101 has further controlled the display screen 109 to indicate (e.g. as an actuatable option 195 at the card 112) that the information collection application 193 is available to be activated, for example to handover over the call 102 to the information collection application 193. For example, as depicted, the device 101 has further controlled the display screen 109 to render and/or provide the actuatable option 195 which may be used to activate the information collection application 193.

As depicted, the actuatable option 195 comprises a button and/or a virtual button, and the like, which, when actuated (e.g. via input received at the input device 110), causes the device 101 to handover the call 102 to the information collection application 193 as described in more detail below.

As depicted, the actuatable option 195 further comprises an indicator (e.g. "Available") indicating that the information collection application 193 is available to be activated. When the information collection application 193 is activated, the indicator may change to indicate that the information collection application 193 is active (e.g. for the call 102 associated with the card 112). While the indicator indicating that the information collection application 193 is active and/or available to be activated is depicted as text, the indicator may comprise any suitable textual and/or graphical indicator.

In particular, the information collection application 193, when activated, may be used to collect information from the caller 104 based on one or more of: a duplicate call policy 196 and information already received from the caller 104 as stored at the record 192.

For example, as depicted, the duplicate call policy 196 is stored at the database 190 and comprises a list of information that is to be collected on duplicate calls, and which may be different from the information of the incident data collection policy 123. For example, as critical information as defined by the incident data collection policy 123 may have already been collected, the duplicate call policy 196 may define less information to be collected on a duplicate call so as to more efficiently process a duplicate call. As depicted, the information that is to be collected on duplicate calls, as indicated by the depicted duplicate call policy 196, comprises a name of a caller, an address of a caller, a phone number of the caller (which may be the same or different from a phone number of a calling device used by the caller to call the device 101), a calling location of the caller, and names of people with the caller. However, the duplicate call policy 196 may comprise any suitable information and may vary by jurisdiction; for example, the duplicate call policy 196 may comprise minimum information to be collected on duplicate calls as defined by a jurisdiction operating the device 101 (e.g. a first county of a state may require the information depicted in the example duplicate call policy 196 FIG. 1 be collected on a duplicate call, while a second county of the state may require more or less information and/or different information be collected on a duplicate call).

The information that is to be collected on duplicate calls, as indicated by the depicted duplicate call policy 196, may be used to question the caller 104 to collect the information associated with the duplicate call policy 196. When a portion of the information, indicated by the depicted duplicate call policy 196, has already been collected (e.g. by the call-taker 108), as indicated by the record 192, such information need not be collected a second time. While the duplicate call policy 196 may be implemented by the call-taker 108, the call-taker may activate the information collection application 193, by way of actuating the actuatable option 195, to handover the call 102 to the information collection application 193 to verbally communicate with the caller 104 to collect information from the caller 104, based on the duplicate call policy 196 and/or information already collected.

While examples described are card-based, and hence use cards (e.g. the card 112) to represent calls to the device 101 at the display screen 109, in other examples, the system 100 may not be card-based, and information of an incident may be collected in any suitable manner and/or calls received at the device 101 may be represented at the display screen 109 in any suitable manner.

Figure 2:
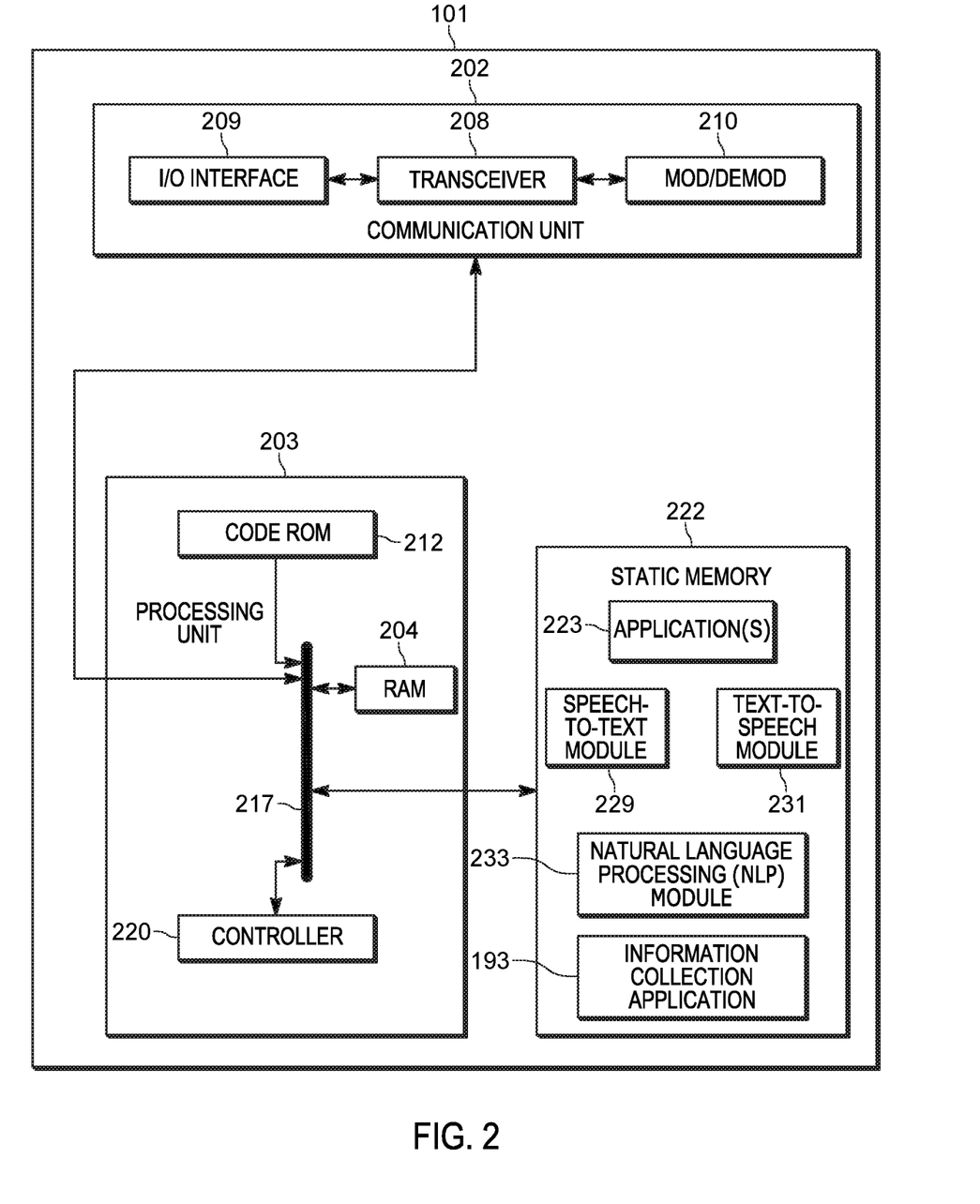
FIG. 2 is a device diagram showing a device structure of a computing device for duplicate call handling at a public-safety answering point device, in accordance with some examples.

Attention is next directed to FIG. 2 which depicts a schematic block diagram of an example of the device 101. In general, the device 101 may comprise one or more servers and/or one or more cloud computing devices, and the like, configured to communicate with the calling device 103 and the communication device 107. However, the device 101 may comprise a computing device such as a personal computer and/or a laptop computer, and the like. In some examples, the device 101 may be combined with the communication device 107. The device 101 may be located at a PSAP, and the like, and/or remote from a PSAP, and the like. Similarly, the device 101 may be located at a same facility (e.g. a PSAP) as the communication device 107, and the like, and/or the device 101 and the communication device 107 may be remote from each other; indeed, the communication device 107 may be remote from a PSAP, and the like.

As depicted, the device 101 comprises: a communication unit 202, a processing unit 203, a Random-Access Memory (RAM) 204, one or more wireless transceivers 208, one or more wired and/or wireless input/output (I/O) interfaces 209, a combined modulator/demodulator 210, a code Read Only Memory (ROM) 212, a common data and address bus 217, a controller 220, and a static memory 222 storing at least one application 223. Hereafter, the at least one application 223 will be interchangeably referred to as the application 223.

While not depicted, the device 101 may include one or more of the input device and a display screen and the like, a microphone (e.g. to receive voice commands) such that a user, such as the call-taker 108, may interact with the device 101. However, a user, such as the call-taker 108, may interact with the device 101 via the communication device 107, for example via the display screen 109 and the input device 110.

As shown in FIG. 2, the device 101 includes the communication unit 202 communicatively coupled to the common data and address bus 217 of the processing unit 203.

The processing unit 203 may include the code Read Only Memory (ROM) 212 coupled to the common data and address bus 217 for storing data for initializing system components. The processing unit 203 may further include the controller 220 coupled, by the common data and address bus 217, to the Random-Access Memory 204 and the static memory 222.

The communication unit 202 may include one or more wired and/or wireless input/output (I/O) interfaces 209 that are configurable to communicate with the calling device 103 and the communication device 107. For example, the communication unit 202 may include one or more transceivers 208 and/or wireless transceivers for communicating with the calling device 103 and/or the communication device 107. Hence, the one or more transceivers 208 may be adapted for communication with one or more communication networks used to communicate with the calling device 103 and/or the communication device 107. For example, the one or more transceivers 208 may be adapted for communication with one or more of the Internet, a digital mobile radio (DMR) network, a Project 25 (P25) network, a terrestrial trunked radio (TETRA) network, a Bluetooth network, a Wi-Fi network, for example operating in accordance with an IEEE 802.11 standard (e.g., 802.11a, 802.11b, 802.11g), an LTE (Long-Term Evolution) network and/or other types of GSM (Global System for Mobile communications) networks, a Worldwide Interoperability for Microwave Access (Wi-MAX) network, for example operating in accordance with an IEEE 802.16 standard, and/or another similar type of wireless network. Hence, the one or more transceivers 208 may include, but are not limited to, a cell phone transceiver, a DMR transceiver, P25 transceiver, a TETRA transceiver, a Bluetooth transceiver, a Wi-Fi transceiver, a WiMAX transceiver, and/or another similar type of wireless transceiver configurable to communicate via a wireless radio network.

The communication unit 202 may optionally include one or more wireline transceivers 208, such as an Ethernet transceiver, a USB (Universal Serial Bus) transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The controller 220 may include ports (e.g. hardware ports) for coupling to other hardware components.

The controller 220 includes one or more logic circuits, one or more processors, one or more microprocessors, one or more ASIC (application-specific integrated circuits) and one or more FPGA (field-programmable gate arrays), and/or another electronic device. In some examples, the controller 220 and/or the device 101 is not a generic controller and/or a generic device, but a device specifically configured to implement functionality for duplicate call handling at a public-safety answering point device. For example, in some examples, the device 101 and/or the controller 220 specifically comprises a computer executable engine configured to implement functionality for duplicate call handling at a public-safety answering point device.

The static memory 222 is a non-transitory machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the example of FIG. 2, programming instructions (e.g., machine readable instructions) that implement the functional teachings of the device 101 as described herein are maintained, persistently, at the memory 222 and used by the controller 220 which makes appropriate utilization of volatile storage during the execution of such programming instructions.

As depicted, the memory 222 further stores the information collection application 193, a speech-to-text module 229, a text-to-speech module 231, and an NLP module 233, which may be used by the device 101 and/or the controller 220 while implementing the application 223. Indeed, while the information collection application 193, the speech-to-text module 229, the text-to-speech module 231, and the NLP module 233 are depicted as being separate from the application 223, one or more of the information collection application 193, the speech-to-text module 229, the text-to-speech module 231, and the NLP module 233 may be combined with the application 223 and/or be components of the application 223.

The speech-to-text module 229 may be to convert speech and/or addresses (e.g. as received on a call 102) to text, and the text-to-speech module 231 may be to convert text to speech and used, for example, by the information collection application 193 when the information collection application 193 is verbally communicate with the caller 104 on the call 102, to collect information from the caller 104. Furthermore, the NLP module 233 may be to monitor audio on the call 102 (e.g. the answers 122) to determine when audio on the call 102 includes critical information, as described below.

Figure 3:
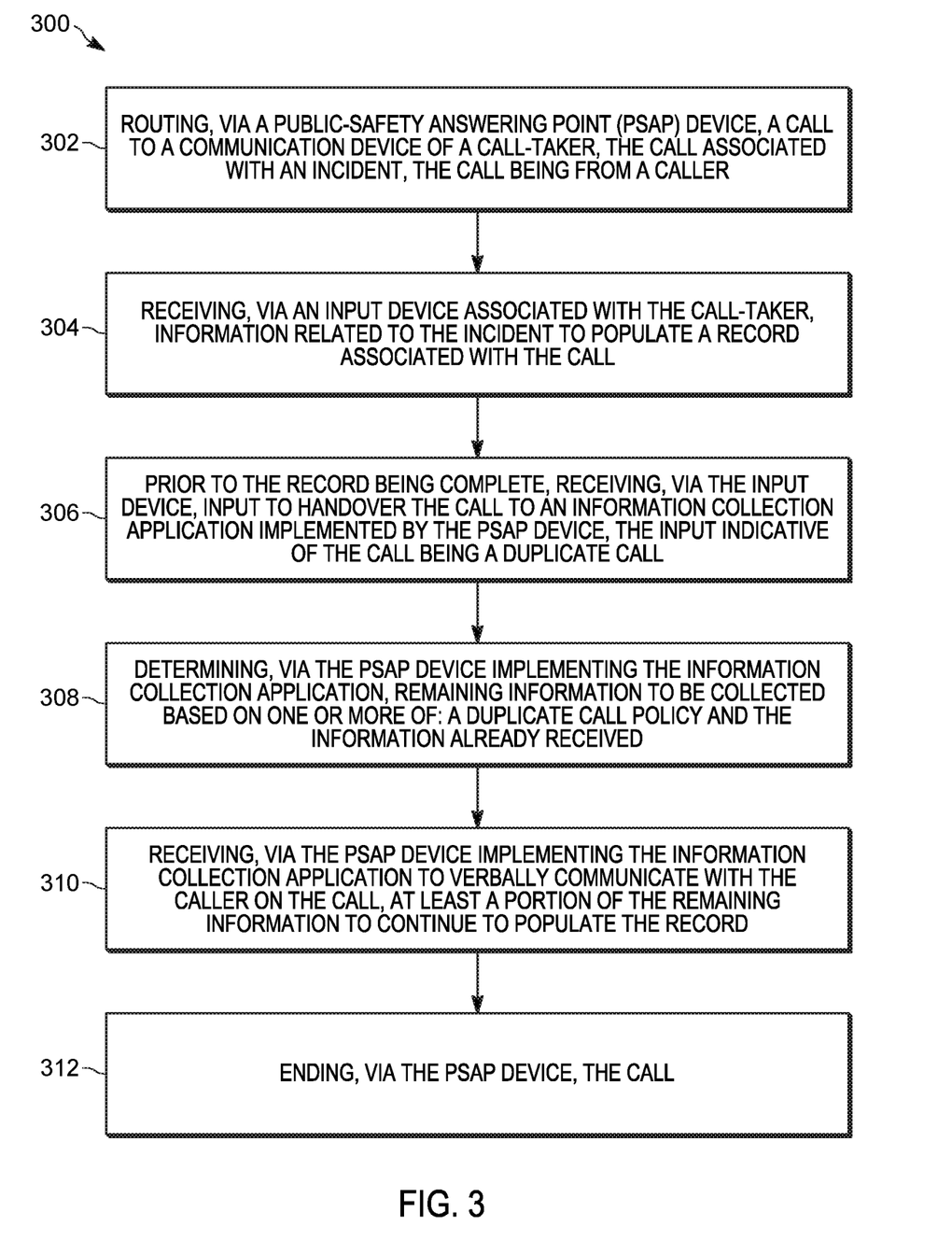
FIG. 3 is a flowchart of a method for duplicate call handling at a public-safety answering point device, in accordance with some examples.

In particular, the memory 222 stores instructions corresponding to the at least one application 223 (and which may include the modules 229, 231, 233) that, when executed by the controller 220, enables the controller 220 to implement functionality described herein including, but not limited to, the blocks of the method set forth in FIG. 3.

In illustrated examples, when the controller 220 executes the one or more applications 223, the controller 220 is enabled to: route, via the communication unit 202, a call (e.g. the call 102) to a communication device of a call-taker (e.g. the communication device 107), the call associated with an incident, the call being from a caller; receive, via an input device (e.g. the input device 110) associated with the call-taker, information related to the incident to populate a record associated with the call; prior to the record being complete, receive, via the input device, input to handover the call to an information collection application (e.g. the information collection application 193), the input indicative of the call being a duplicate call; determine, via the information collection application, remaining information to be collected based on one or more of: a duplicate call policy (e.g. the duplicate call policy 196) and the information already received; receive, via the information collection application verbally communicating with the caller on the call, at least a portion of the remaining information to continue to populate the record; and end the call.

The application 223, and/or the information collection application 193, etc., may include numerical algorithms to determine one or more of: when a call is a duplicate call, critical information in audio provided by a caller, and/or any other functionality of the application 223, and/or the information collection application 193, etc. Such algorithms may be included at the NLP module 233.

Alternatively, the application 223 may include machine learning and/or deep-learning based algorithms and/or neural networks, and the like, which have been trained to determine one or more of: when a call is a duplicate call, critical information in audio provided by a caller, and/or any other functionality of the application 223, and/or the information collection application 193, etc.

Furthermore, in these examples, the application 223 may initially be operated by the controller 220 in a training mode to train the machine learning and/or deep-learning based algorithms and/or neural networks of the application 223 to determine one or more of: when a call is a duplicate call, critical information in audio provided by a caller, and/or any other functionality of the application 223, and/or the information collection application 193, etc.

The one or more machine learning algorithms and/or deep learning algorithms and/or neural networks of the application 223 may include, but are not limited to: a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public-safety environments, such as a 911 call center. Any suitable machine learning algorithm and/or deep learning algorithm and/or neural network is within the scope of present examples.

While details of the calling device 103 and the communication device 107 are not depicted, the calling device 103 and the communication device 107 may have components similar to the device 101 adapted, however, for the functionality of the calling device 103 and the communication device 107. For example, the calling device 103 and/or the communication device 107 may include respective display screens (e.g. such as the display screen 109 as depicted), speakers, microphones, location determining devices (e.g. GPS devices), and the like.

Attention is now directed to FIG. 3 which depicts a flowchart representative of a method 300 for duplicate call handling at a public-safety answering point device. The operations of the method 300 of FIG. 3 correspond to machine readable instructions that are executed by the device 101, and specifically the controller 220 of the device 101. In the illustrated example, the instructions represented by the blocks of FIG. 3 are stored at the memory 222 for example, as the application 223. The method 300 of FIG. 3 is one way in which the controller 220 and/or the device 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the device 101 routes the call 102 to the communication device 107 of the call-taker 108, the call 102 associated with an incident, the call 102 being from the caller 104. It is understood at the block 302 that the call 102 has been received at the controller 220 and/or the device 101, as described above.

At a block 304, the controller 220 and/or the device 101 receives, via the input device 110 associated with the call-taker 108, information related to the incident to populate the record 192 associated with the call 102. For example, the information related to the incident may be collected by the call-taker 108 using the questions 121, and the answers 122 may be used to populate the card 112 and/or the record 192.

At a block 306, the controller 220 and/or the device 101, prior to the record 192 being complete, receives, via the input device 110, input to handover the call 102 to the information collection application 193 implemented by the PSAP device 101, the input indicative of the call 102 being a duplicate call.

Whether the record 192 is complete or not may be based on the incident data collection policy 123. For example, the record 192 may be complete when all the information defined by the incident data collection policy 123 has been collected on the call 102 and stored at the record 192; similarly, the record 192 may not be complete when not all the information defined by the incident data collection policy 123 has been collected on the call 102 and stored at the record 192. In some examples, the call-taker 108 may decide not to handover the call 102 to the information collection application 193; in these examples, when the record 192 is complete, the actuatable option 195 may be disabled as there may not be a need to hand over the call 102 to the information collection application 193.

The block 306 may further comprise the controller 220 and/or the device 101: determining that the call 102 is a duplicate call; and controlling the display screen 109 associated with the call-taker 108 to provide the indication 194 of the call 102 being the duplicate call. For example, the controller 220 and/or the device 101 may determine that the call 102 is a duplicate call by comparing the records 191, 192 and/or comparing information stored at the records 191, 192 to determine whether the record 192 is associated with a same given incident as the record 191. Such a determination may be based on incident identifiers of the records 191, 192 and/or any other suitable information stored at the records 191, 192.

Hence, via the indication 194, the call-taker 108 may be provided with a visual indication of the call 102 being a duplicate call. However, such an indication may alternatively be provided aurally via speakers, and the like, of the communication device 107.

Further, the method 300 may further comprise the controller 220 and/or the device 101 controlling the display screen 109 associated with the call-taker 108 to provide the actuatable option 195 to activate or inactivate the information collection application 193. However, the information collection application 193 may be activated or inactivated in any suitable manner, for example via a menu structure and/or via verbal commands spoken by the call-taker 108.

However, the method 300 may further comprise the controller 220 and/or the device 101 controlling the display screen 109 associated with the call-taker 108 to indicate that the information collection application 193 is active, or one or more of inactive and available to activate, in any suitable manner. For example, the card 112 may be provided with an icon, and the like, which indicates whether the information collection application 193 is active or inactive (and/or available to be activated), which may be provided in addition to the actuatable option 195 and/or in place of the actuatable option 195.

The call-taker 108 may activate the actuatable option 195 via the input device 110 to handover the call 102 to the information collection application 193. Input to handover the call 102 may comprises receipt of input that activates the actuatable option 195 and/or any other suitable input (e.g. including, but not limited to, verbal commands, and the like). Furthermore, the input that activates the actuatable option 195, and the like, generally indicates that the call 102 is a duplicate call such that the duplicate call policy 196 is to be followed when the input is received, rather than the incident data collection policy 123.

At a block 308, the controller 220 and/or the device 101, determines, via the PSAP device 101 implementing the information collection application 193, remaining information to be collected based on one or more of: the duplicate call policy 196 and the information already received. For example, the device 101 may access, and/or retrieve, the duplicate call policy 196 and the record 192 to determine, via the information collection application 193, information be to collected, as defined by the duplicate call policy 196, and the information already collected at the record 192. When the information already collected at the record 192 includes information defined by the duplicate call policy 196, the remaining information to be collected may comprise the information defined by the duplicate call policy 196 that has not yet been collected. Put another way, the duplicate call policy 196 is generally indicative of the remaining information to be collected when the call 102 is a duplicate call.

In some examples, the method 300 may further comprise the controller 220 and/or the device 101 controlling the display screen 109 associated with the call-taker 108 to provide a list of items of the remaining information to be received. For example, the list of items of the remaining information to be received may be rendered at the display screen 109 while the information collection application 193 is active and collecting the remaining information.

At a block 310, the controller 220 and/or the device 101 receives, via the PSAP device 101 implementing the information collection application 193 to verbally communicate with the caller 104 on the call 102, at least a portion of the remaining information to continue to populate the record 192.

For example, the information collection application 193 may ask questions on the call 102 to request the remaining information to be collected in the form of answers to the questions by the caller 104. The answers may be converted to text via the speech-to-text module 229 and stored at the record 192.

In some examples, the method 300 may further comprise the controller 220 and/or the device 101, while the information collection application 193 is receiving items of the remaining information, controlling the display screen 109 associated with the call-taker 108 to provide an indication of the items received. For example as an item is received, the record 192 may be populated and text indicating the item may be rendered at the display screen 109.

In some examples, the method 300 may further comprise the controller 220 and/or the device 101 determining the remaining information (e.g. based on the information already received) may be based, at least in part, on natural language processing. For example, the answers received at the device 101, in response to questions asked by the device 101 implementing the information collection application 193 may not be exact answers to the question. In an example, the device 101 implementing the information collection application 193 may ask "What is your address" to collect information related to the address of the caller 104; the caller 104 may respond with a rambling answer that may include their address, such as "Oh, hey, my address is twelve oh one Main Avenue, no sorry street; sorry, I'm really upset by the fire". Such an answer includes their address as "1201 Main Street", but is not provided exactly as "1201 Main Street"; hence natural language processing, as provided, for example by the NLP module 233, may be used to process an answer to extract remaining information of the duplicate call policy 196.

At a block 312, the controller 220 and/or the device 101 ends the call 102 and/or hangs up the call 102. For example, the controller 220 and/or the device 101 may end the call 102 when the record 192 is completed, as determined using the duplicate call policy 196; in particular, the controller 220 and/or the device 101 may end the call 102 when the information defined by the duplicate call policy 196 has been collected and used to populate the record 192. Hence, in these examples, the record 192 may be determined to be complete when the record 192 includes the information defined by the duplicate call policy 196 and/or all the information defined by the duplicate call policy 196. However, in other examples, the call 102 may be ended when the caller 104 hangs up and/or ends the call 102, whether the record 192 is complete or incomplete.

In some examples, the method 300 may further comprise the controller 220 and/or the device 101: determining that given information, of the remaining information received by the information collection application 193, comprises critical information; and transferring the call 102 back to the call-taker 108.

For example, while the controller 220 and/or the device 101 is collecting, via the information collection application 193, the remaining information defined by the duplicate call policy 196 (e.g. at the block 310), the controller 220 and/or the device 101 may determine (e.g. using NLP processing), that the caller 104 is providing critical information, such as a victim of the incident being injured that was not previously reported and/or a new address (and/or location) being involved in the incident (e.g. another building is on fire), and the like (e.g. the record 191 may be absent of a name of a victim provided by the caller 104 and/or the new address (and/or location) reported by the caller 104). However, the additional critical information may be determined in any suitable manner including, but not limited to use of a machine learning algorithm to determine whether information provided by the caller 104 is critical.

In these examples, the controller 220 and/or the device 101 may transfer the call 102 back to the communication device 107 such that the call-taker 108 may collect the additional critical information. Further, the call-taker 108 may be directed to collect information according to the incident data collection policy 123 rather than the duplicate call policy 196. Further the actuatable option 195, and/or an indication of the information collection application 193 provided at the display screen 109, may be changed to indicate that the information collection application 193 is one or more of inactive (e.g. on the call 102) and available to be activated; for example, the call-taker 108 may collect the critical information and then again activate the information collection application 193 via the actuatable option 195 to cause the call 102 to again be handed over to the information collection application 193 to collect any remaining information of the duplicate call policy 196.

Figure 4:
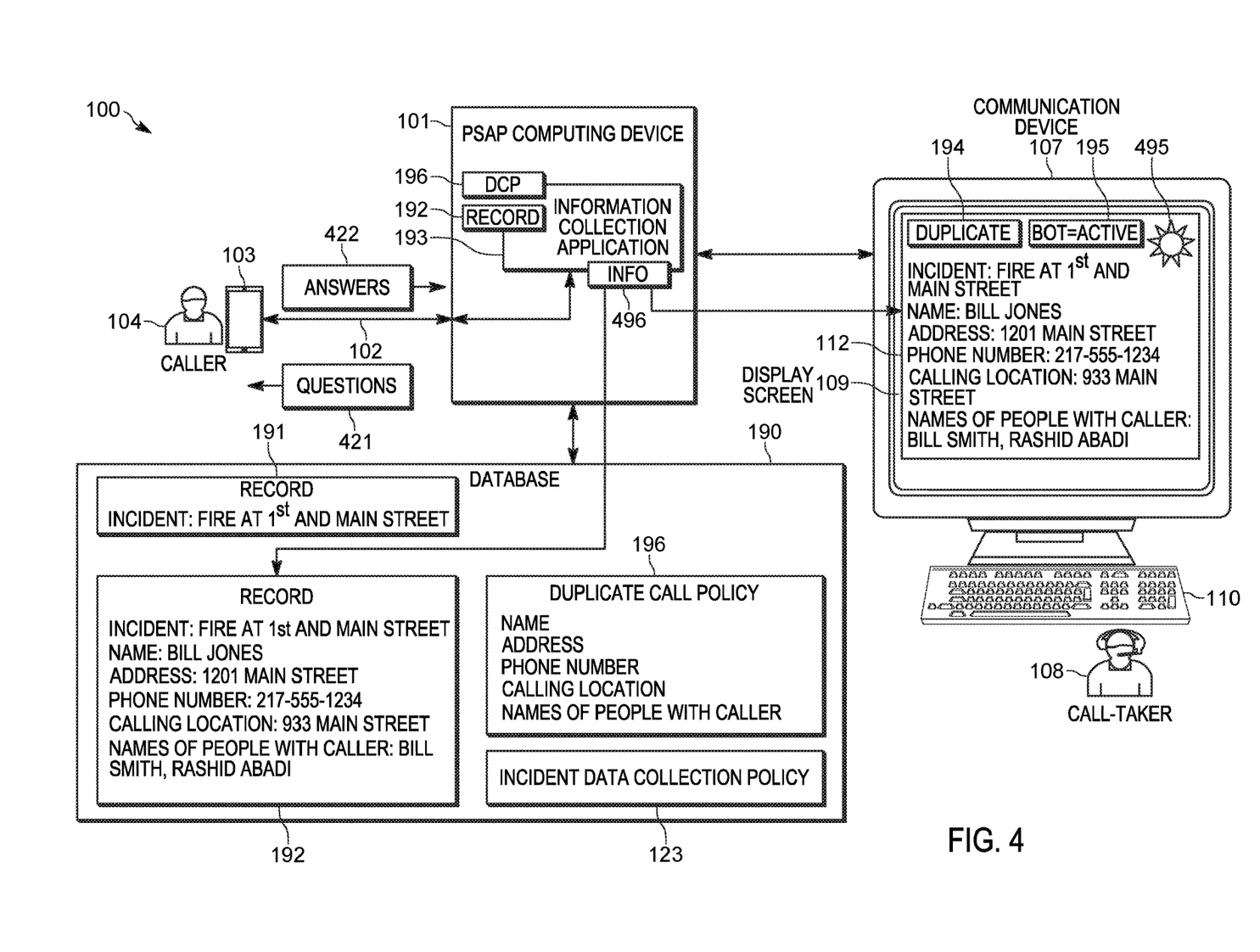
FIG. 4 depicts an example of duplicate call handling at a public-safety answering point device implemented in the system of FIG. 1, in accordance with some examples.
Figure 5:
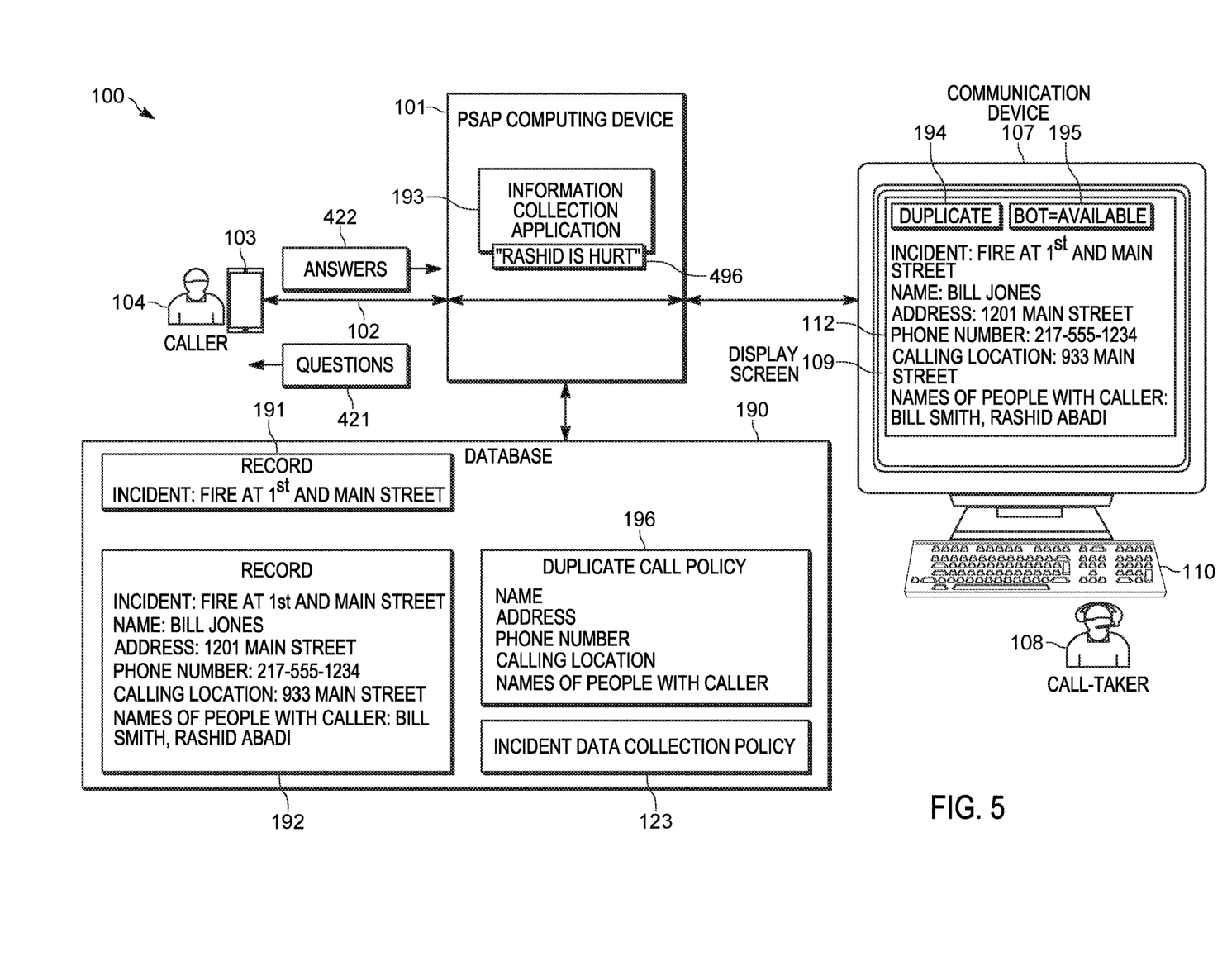
FIG. 5 depicts another example of duplicate call handling at a public-safety answering point device implemented in the system of FIG. 1, in accordance with some examples.

An example of the method 300 will next be described with reference to FIG. 1, FIG. 4 and FIG. 5 FIG. 4 and FIG. 5 are substantially similar to FIG. 1 with like components having like numbers.

With reference back to FIG. 1, it is understood that the call 102 has been received and the call 102 has been routed (e.g. at the block 302 of the method 300) to the communication device 107. It is further understood that the device 101 has determined that the call 102 is a duplicate call, as described above.

Also with reference to FIG. 1, it is understood that information related to the incident being reported by the caller 104 has been received (e.g. at the block 304 of the method 300) and used to populate the 192 record associated with the call 102.

Comparing FIG. 1 and FIG. 4, it is further understood that input has been received (e.g. at the block 306 of the method 300) to handover the call 102 to the information collection application 193. For example, in FIG. 4, the actuatable option 195 has been actuated, as described above, such that the call 102 has been routed from the communication device 107 to the information collection application 193 (and/or the controller 220 implementing the information collection application 193). For example, as depicted, the duplicate call policy 196 and the record 192 have been retrieved (as depicted), and/or accessed, by the device 101 such that the information collection application 193 may determine (e.g. at the block 308 of the method 300) remaining information to collect from the caller 104, as described above.

While the information collection application 193 is active, the device 101 may route other calls (not depicted) to the communication device 107; put another way, activating the information collection application 193 to handle the call 102 generally frees the communication device 107 and/or the call-taker 108 to handle other calls to the device 101 (e.g. other 911 calls to the PSAP).

In particular, FIG. 4 further depicts the device 101 implementing the information collection application 193 verbally communicating with the caller 104 to ask questions 421 to collect the remaining information 496. For example, as the name of the caller 104 has already been received and stored at the record 192, the remaining information 496 may include, but is not limited to, the address, phone number and calling location of the caller 104, as well as names of people with the caller 104. Put another way, the information collection application 193 does not again ask the caller 104 for their name.

FIG. 4 further depicts the device 101 receiving (e.g. at the block 310 of the method 300) answers 422 to the questions 421 which include the remaining information 496. For example, a question 421 may include "What is your address?" and an answer 422 may include an indication thereof, as described above.

FIG. 4 further depicts the device 101 populating the record 192 with the remaining information 496 and further controlling the display screen 109 to render and/or provide the remaining information 496, for example as the remaining information 496 is collected. For example, as depicted the remaining information includes the address of the caller 104 (e.g. "1201 Main Street"), a phone number of the caller 104 (e.g. "217-555-1234"), a calling location of the caller (e.g. "933 Main Street"), and names of people with the caller (e.g. "Bill Smith", "Rashid Abadi").

With further reference to FIG. 4, the indication of the actuatable option 195 has been changed to "Active" indicating that the information collection application 193 is active on the call 102. Furthermore, a graphical indication 495 is rendered and/or provided at the display screen 109 indicating that the information collection application 193 is active on the call 102; for example, as depicted, the graphical indication 495 comprises an icon rendered and/or provided at the card 112.

While not depicted, when the record 192 is complete as defined by the call duplicate policy 196 (e.g. the record 192 includes the information and/or all the information defined by the call duplicate policy 196), the device 101 may end the call 102 (e.g. at the block 312 of the method 300).

However, as depicted in FIG. 5, the remaining information 496, and/or audio collected by the device 101, may include critical information (e.g. "Rashid Is Hurt"). Hence, the device 101 implementing the information collection application 193 may determine that the remaining information 496 includes critical information which, as depicted, causes the device 101 to handover the call 102 back to the communication device 107. In some examples, a current call of the communication device 107 may be interrupted and/or transferred to another communication device of the PSAP, to allow the call-taker 108 to again talk to the caller 104. However, in other examples, the call-taker 108 may be provided (e.g. at the display screen 109) with an option to take the call 102 back from the information collection application 193 and, for example end a current call and/or transfer a current call to another communication device. However any suitable call handling of the call 102 is within the scope of the present specification.

While the information collection application 193 has been described with respect to specific functionality with regards to duplicate call handling, the information collection application 193 may enable the device 101 to perform other functionality. For example, the information collection application 193 may enable the device 101 to automatically answer and/or screen calls for example to answer and ask initial questions before routing to the communication device 107. The information collection application 193 may implement such functionality according to a call handling policy (not depicted) which may be defined by a jurisdiction operating the device 101; for example, the call handling policy may define when the device 101 may use the information collection application 193 to answer a call and/or a procedure for how the information collection application 193 may interact on a call (e.g. such a call handling policy may define which information the information collection application 193 is to collect when answering a call, similar to the incident data collection policy 123 and/or the duplicate call policy 196).

The information collection application 193 may further enable the device 101 to communicate information to first responders dispatched to an incident, for example by communicating information of the record 191 and/or the record 192 to first responders on an assigned talkgroup. Similarly, the device 101 may further use the information collection application 193 to select and/or dispatch first responders dispatched to an incident, and/or group radios of the first responders, dispatched to the incident, to a common talkgroup. The information collection application 193 may further enable the device 101 to perform analytics on historical calls and/or callers. Indeed, the information collection application 193 may enable the device 101 to perform any suitable call handling functionality, and/or dispatching functionality and/or talkgroup grouping functionality and/or analytic functionality, and the like.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A method comprising:
routing, via a public-safety answering point (PSAP) device, a call to a communication device of a call-taker, the call associated with an incident, the call being from a caller;
receiving, via an input device associated with the call-taker, information related to the incident to populate a record associated with the call;
prior to the record being complete, receiving, via the input device, input to handover the call to an information collection application implemented by the PSAP device, the input indicative of the call being a duplicate call;
determining, via the PSAP device implementing the information collection application, remaining information to be collected based on one or more of: a duplicate call policy and the information already received;
receiving, via the PSAP device implementing the information collection application to verbally communicate with the caller on the call, at least a portion of the remaining information to continue to populate the record; and
ending, via the PSAP device, the call.

2. The method of claim 1, wherein ending, via the PSAP device, the call comprises:
ending the call when the record is complete.

3. The method of claim 1, further comprising:
determining, via the PSAP device, that given information, of the remaining information received by the information collection application, comprises critical information; and
transferring, via the PSAP device, the call back to the communication device of the call-taker.

4. The method of claim 1, further comprising:
determining, via the PSAP device, that the call is the duplicate call; and
controlling, via the PSAP device, a display screen associated with the call-taker to provide an indication of the call being the duplicate call.

5. The method of claim 1, further comprising:
controlling a display screen associated with the call-taker to indicate that the information collection application is active or one or more of: inactive, and available to activate.

6. The method of claim 1, further comprising:
controlling a display screen associated with the call-taker to provide an actuatable option to activate or inactivate the information collection application, wherein the receiving the input to handover the call to the information collection application comprises receiving the input via the actuatable option.

7. The method of claim 1, further comprising:
controlling a display screen associated with the call-taker to provide a list of items of the remaining information to be received.

8. The method of claim 1, further comprising:
while the information collection application is receiving items of the remaining information, controlling a display screen associated with the call-taker to provide an indication of the items received.

9. The method of claim 1, wherein the duplicate call policy is indicative of the remaining information to be collected when the call is the duplicate call.

10. The method of claim 1, further comprising:
determining the remaining information based on the information already received based, at least in part, on natural language processing.

11. A computing device comprising:
a communication unit; and
a controller configured to:
route, via the communication unit, a call to a communication device of a call-taker, the call associated with an incident, the call being from a caller;
receive, via an input device associated with the call-taker, information related to the incident to populate a record associated with the call;
prior to the record being complete, receive, via the input device, input to handover the call to an information collection application, the input indicative of the call being a duplicate call;
determine, via the information collection application, remaining information to be collected based on one or more of: a duplicate call policy and the information already received;
receive, via the information collection application verbally communicating with the caller on the call, at least a portion of the remaining information to continue to populate the record; and
end the call.

12. The computing device of claim 11, wherein the controller is further configured to end the call by:
ending the call when the record is complete.

13. The computing device of claim 11, wherein the controller is further configured to:
determine that given information, of the remaining information received by the information collection application, comprises critical information; and
transfer the call back to the communication device of the call-taker.

14. The computing device of claim 11, wherein the controller is further configured to:
determine that the call is the duplicate call; and
control a display screen associated with the call-taker to provide an indication of the call being the duplicate call.

15. The computing device of claim 11, wherein the controller is further configured to:
control a display screen associated with the call-taker to indicate that the information collection application is active or one or more of: inactive, and available to activate.

16. The computing device of claim 11, wherein the controller is further configured to:
control a display screen associated with the call-taker to provide an actuatable option to activate or inactivate the information collection application,
wherein the controller is further configured to receive the input to handover the call to the information collection application by: receiving the input via the actuatable option.

17. The computing device of claim 11, wherein the controller is further configured to:
control a display screen associated with the call-taker to provide a list of items of the remaining information to be received.

18. The computing device of claim 11, wherein the controller is further configured to:
while the information collection application is receiving items of the remaining information, control a display screen associated with the call-taker to provide an indication of the items received.

19. The computing device of claim 11, wherein the duplicate call policy is indicative of the remaining information to be collected when the call is the duplicate call.

20. The computing device of claim 11, wherein the controller is further configured to:
   determine the remaining information based on the information already received based, at least in part, on natural language processing.

\* \* \* \* \*